United States Patent
Thomas

Patent Number: 5,452,685
Date of Patent: Sep. 26, 1995

[54] DOG BOOTIES

[76] Inventor: Peggy Thomas, 708 E. Solana Dr., Tempe, Ariz. 85281

[21] Appl. No.: 210,682

[22] Filed: Mar. 18, 1994

[51] Int. Cl.[6] .................................................. A01K 13/00
[52] U.S. Cl. .................................................. 119/850; 54/82
[58] Field of Search ...................... 54/79.1, 82; 119/850, 119/851; 36/111

[56] References Cited

U.S. PATENT DOCUMENTS

| | | | |
|---|---|---|---|
| D. 229,197 | 11/1973 | Jackson | 36/111 |
| 2,064,566 | 12/1936 | Richman | 54/82 X |
| 2,424,172 | 7/1947 | Huddleston | 36/111 |
| 2,443,831 | 6/1948 | Miller | 54/79.1 |
| 2,446,371 | 8/1948 | Jones | 168/18 X |
| 2,535,394 | 12/1950 | Davis | 36/111 |
| 2,691,853 | 8/1953 | Lewis | 54/82 X |
| 3,209,726 | 10/1965 | Fisher | 54/82 |
| 3,762,073 | 10/1973 | Cantales | 2/46 X |
| 4,457,261 | 7/1984 | Marshall | 54/82 |
| 4,458,431 | 7/1984 | Sinclair | 36/88 |
| 4,543,911 | 10/1985 | Marshall | 54/82 |
| 4,744,333 | 5/1988 | Taylor | 119/850 |
| 5,148,657 | 9/1992 | Stafford et al. | 54/82 |

FOREIGN PATENT DOCUMENTS

| | | | |
|---|---|---|---|
| 2560745 | 9/1985 | France | 54/82 |
| 8501183 | 3/1985 | WIPO | 54/82 |

*Primary Examiner*—Robert P. Swiatek
*Attorney, Agent, or Firm*—K. Brooke Coleman; David G. Rosenbaum

[57] ABSTRACT

A bootie for canines which comprises a tube tapered-off at least near a closed bottom and having attached around an open top fastening means a complementary hook and loop type fastener strip adapted to decrease the diameter of the opening for securing the top to the canine, the tube being made of a heavy-duty flexible canvas, lined with a second layer of fabric, with polyacrylamide granules or other insulating substance in between the two layers of material.

15 Claims, 5 Drawing Sheets

DOG BOOTIES

BACKGROUND OF THE INVENTION

1. Field of the Invention

This invention relates to protective wear for the paws of canines to protect them from hot pavement, blacktop, sidewalks, and streets.

2. Description of the Prior Art

During the summer, seeing-eye dogs, service dogs, working dogs and other canines suffer from the heat, in the form of hot pavement which burns the pads of their feet. Intense discomfort and even burning, cracking, and infection of the paws may result unless suitable protection is provided. No prior art has addressed specifically the problem of heat on animals' feet.

On the market are mittens for canines made of canvas or latex (Marshall). The disadvantage of these mittens is that the single layer of canvas or latex does not protect the paws from burning on hot pavement. Also, the mittens are secured to the dog's leg or paw with a strip of self-adhesive material at the open top of the mittens (Marshall). There is no guide loop to support the opposite end of the strap to prevent the self-adhesive strip from slipping up in the back and allowing the backside of the mittens to hang open and subsequently slip off the dog's foot. In practice, the mittens do not stay securely in place for any length of time.

U.S. Pat. No. 4,744,333 discloses protective footwear for canines which are held in place by a suspender system, which works well with small dogs, but does not function well on large breed dogs, i.e., the type of dogs used as seeing-eye dogs and service dogs. Furthermore, the suspender system becomes entangled in or impedes the function of a working dog's given attire e.g., backpack, pulling harness, or guide harness.

BRIEF SUMMARY OF THE INVENTION

According to the present invention there is provided a bootie made of two layers of fabric with an insulating substance in between, the preferred substance being polyacrylamide granules (a water retaining polymer).

The present bootie keeps the pads of the paws cool and prevents the pads from burning on hot surfaces. The booties are to be soaked in tap water for approximately 40 minutes before using, allowing the granules inside to absorb water, soften, and expand, producing a gel-like layer. The water retaining polyacrylamide granules provide a soft, cool, comfortable, protective, shock-absorbing padding. The cooling effect occurs as the water slowly evaporates (over approximately 24 hours) from the polyacrylamide granules. The present bootie stays on during use, having a guide loop on the backside to prevent the self-adhesive strip from slipping.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 5:
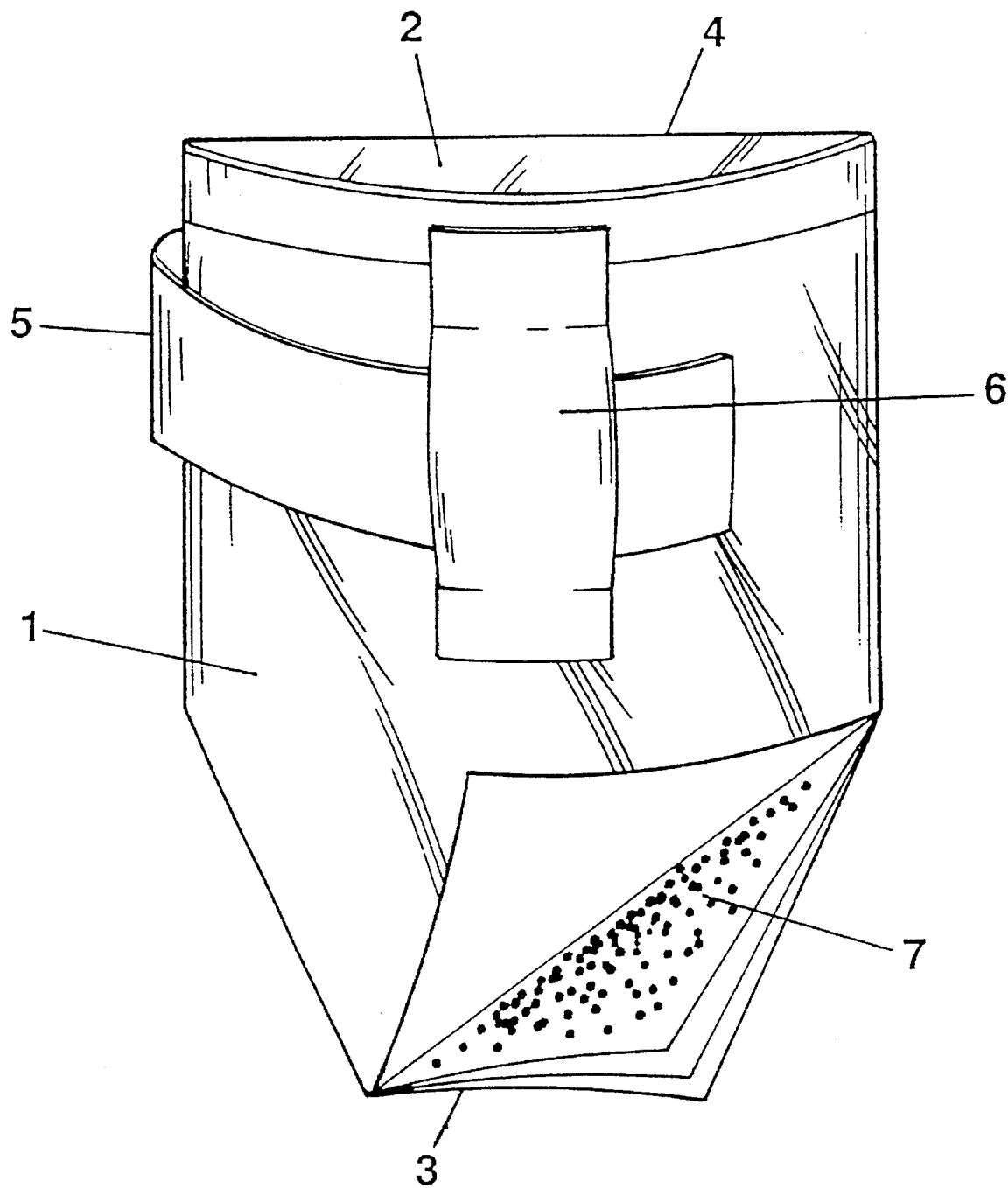
FIG. 5 shows the back of the bootie with the fabric layer peeled away to reveal the polyacrylamide granules.

The material from which the booties according to this invention are made is a heavy-duty flexible canvas fabric on the outside 1, a strong light-weight flexible rip-stop nylon fabric on the inside 2, and a layer of polyacrylamide crystals 7 in between, as shown in FIG. 5. The polyacrylamide crystals are commercially available e.g., it is used for the manufacture of Broadleaf P4 (registered Trademark) water-absorbing granules used as an additive to plant soil. Not any material is useful and the success of the present invention is a result at least of the fact that the polymers used are water-storing, slow -releasing, and completely non-toxic. The canvas and nylon fabrics are also commercially available. The fabric is generally less than 0.02 inch thick. Nevertheless, this fabric is strong enough to withstand the wear and tear of walking on the summer streets.

The booties may be made from the canvas and nylon fabrics by cutting rectangular pieces the width of which are about the same as the width of the dog's paw (one paw of a dog may be wider than another) when the dog is standing. The pieces are folded in about the middle of the long side of the rectangular, such that the canvas is on the outside 1 under the paw, and the nylon is on the inside 2 of the bootie acting as a liner, and the sides are turned in slightly so as to cause a tapering off at least at the bottom 3 so as to avoid rectangular corners as illustrated in the figures. The sides are attached to each other, for instance, by stitching them together. The polyacrylamide granules (~<2 grams) are then poured in between the layers of canvas and nylon, and then the nylon and canvas are attached together along the periphery of the open top, sealing in the granules. The periphery of the open top after the sides are attached to each other is about the same length as the periphery of the dog's paw when the dog is standing. There is no stitching on the bottom so that the dog does not feel any seam under his paws.

The invention uses a self-gripping material 5 fastened at or near the top 4 of the bootie to secure the bootie to the dog's paws or legs. This material does not cut off blood circulation and can be closed and opened in one easy movement. The material is available commercially, e.g., under the name Velcro (registered Trademark). The Velcro material comprises a first strip or piece of fabric having a surface with a plurality of small hook-like elements, and a second strip or piece of fabric having a plurality of small loop-like elements. Upon contacting said surfaces the two strips or pieces strongly grip each other. This material avoids the need for buttons, buckles, elastic bands, or drawstrings and was found to be sufficiently gripping to prevent slipping off during use. The material is available in long strips.

Figure 1:
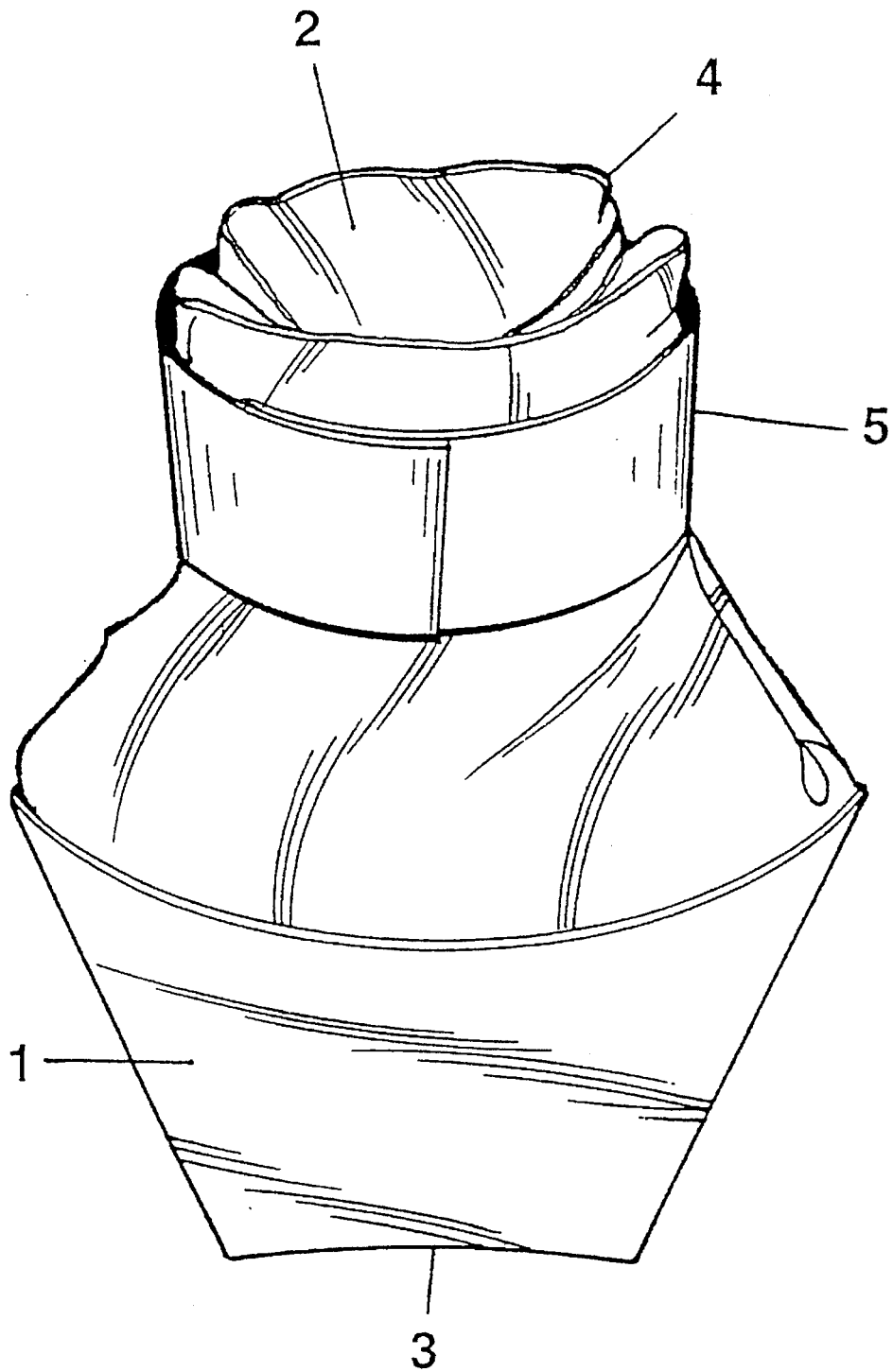
FIG. 1 shows the bootie in closed form while secured to the dog's foot or leg.
Figure 2:
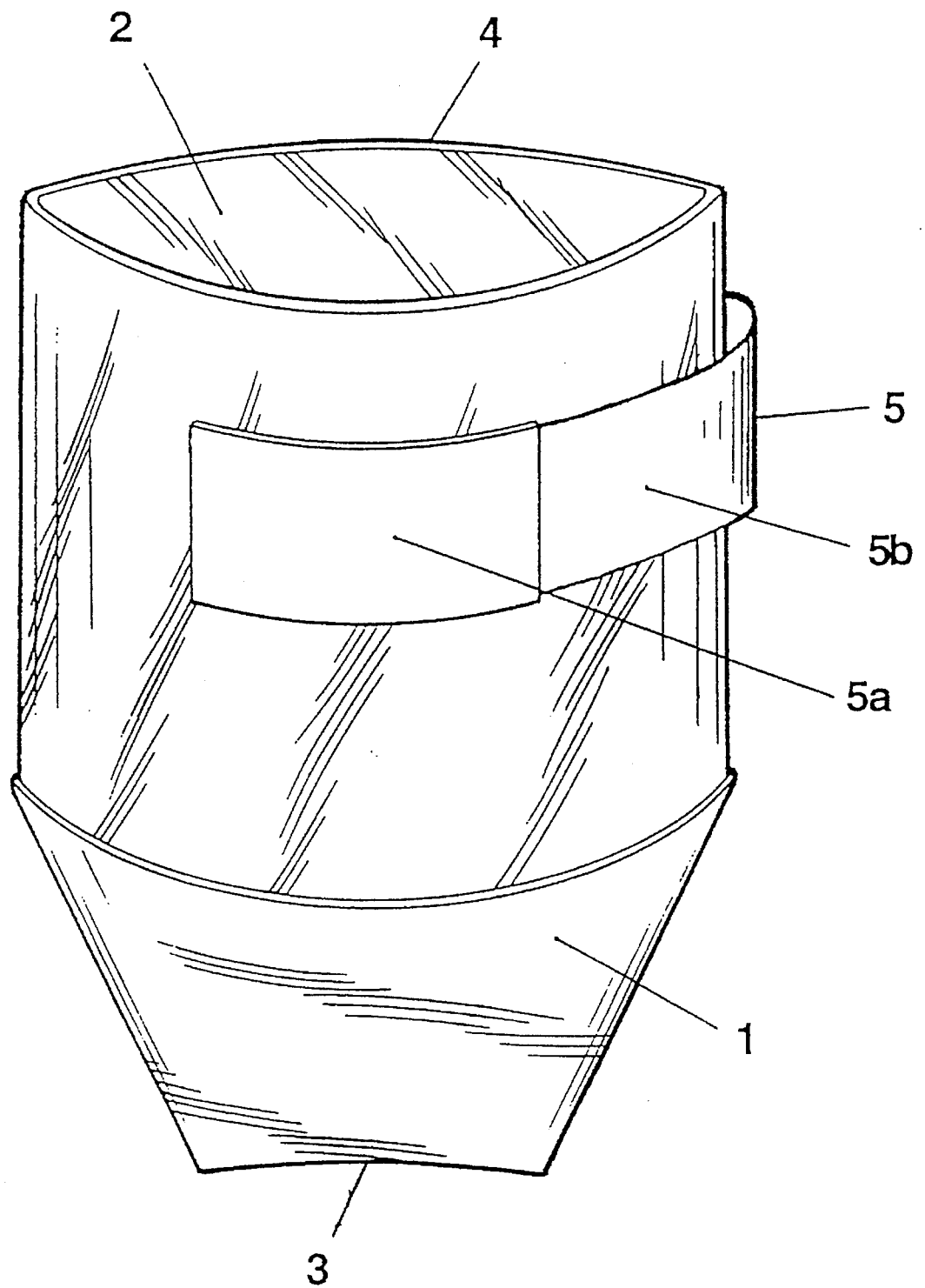
FIG. 2 shows the front of the bootie in open form.
Figure 3:
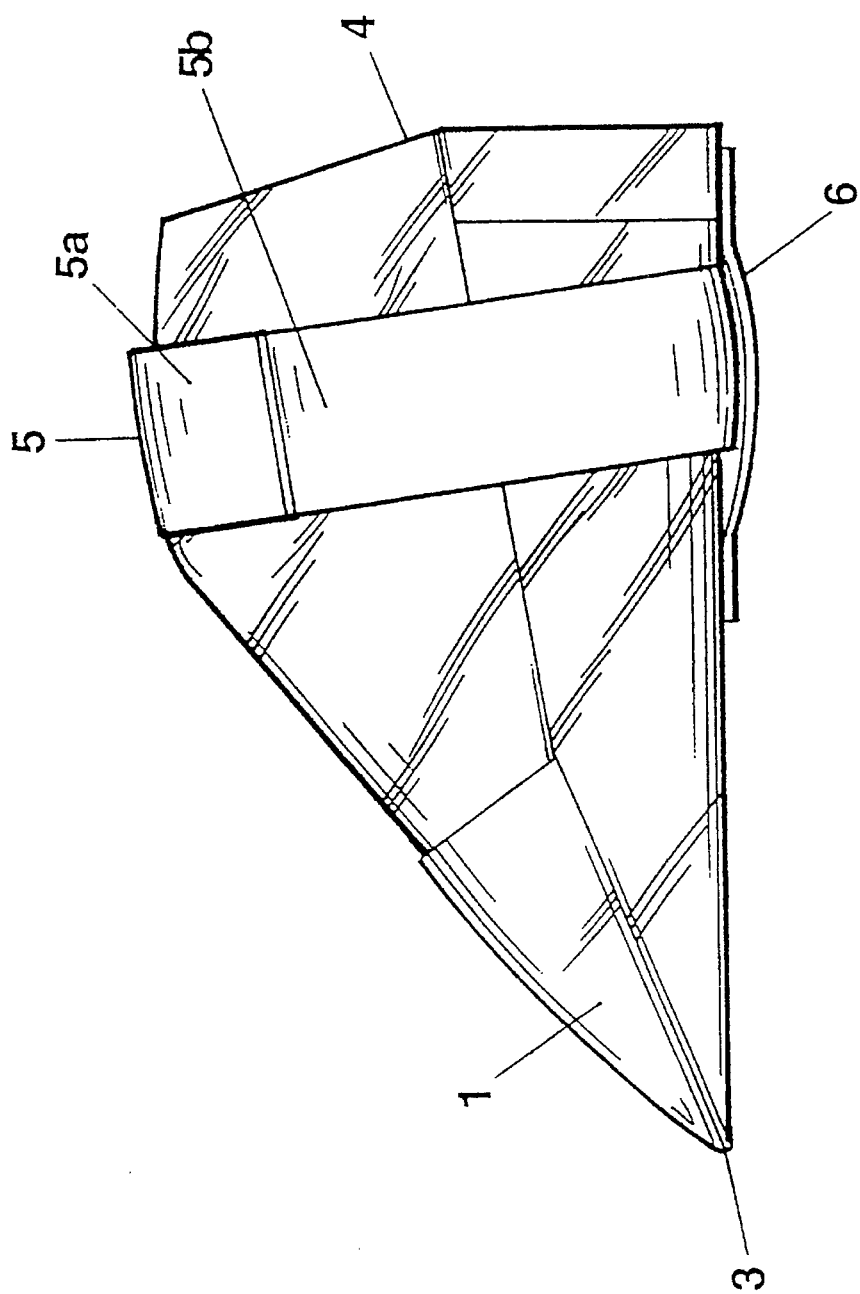
FIG. 3 shows a side view of the bootie according to this invention.
Figure 4:
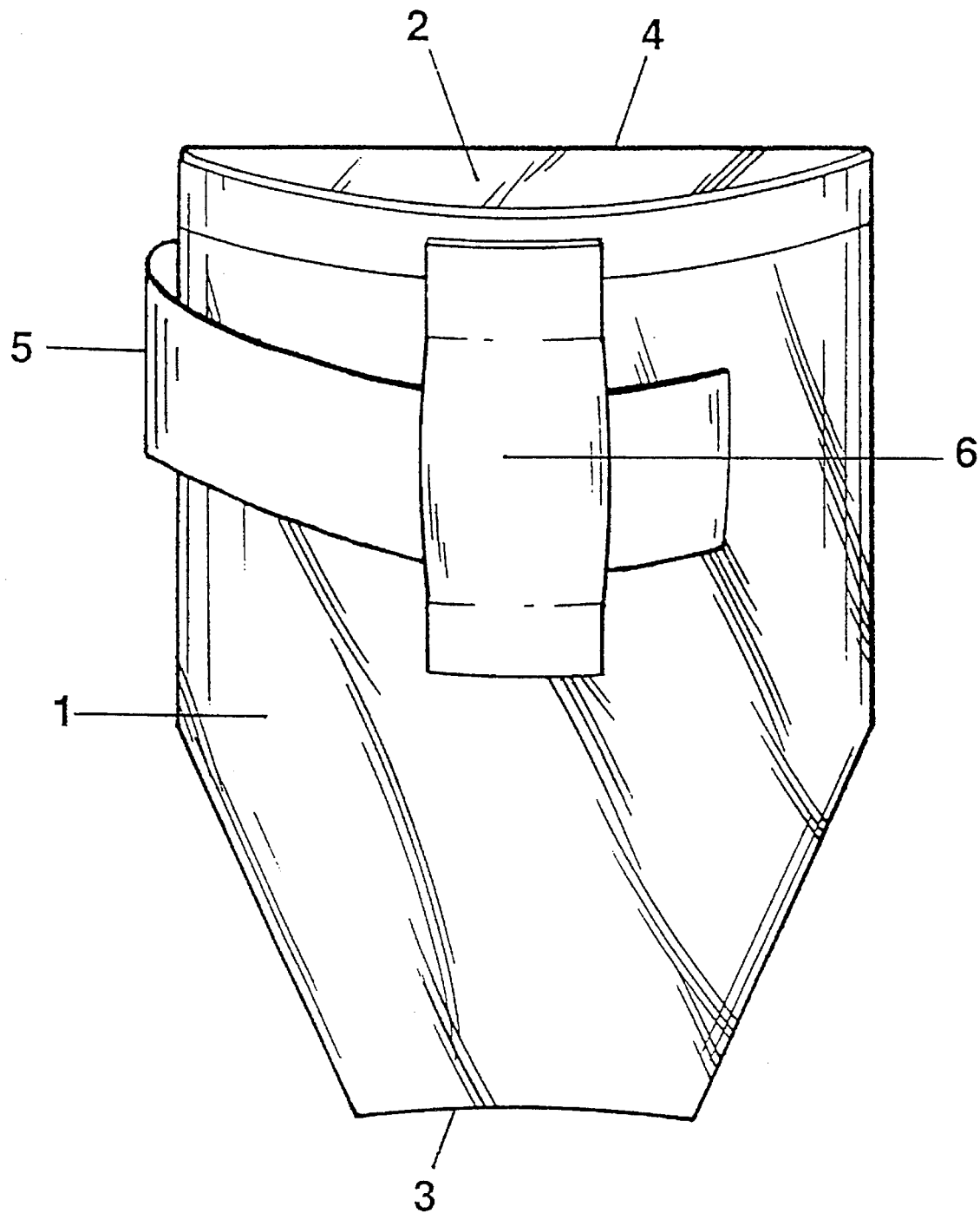
FIG. 4 shows the back of the bootie in open form.

Such strip is attached at or near the top of the bootie, by any means, e.g., by stitching or use of adhesive. The strip is longer than the periphery of the top, and the loose strip 5b remaining after attachment to the top is used to fasten the top to the dog's leg by leading the loose strip through the guide loop 6 and then tightly around the leg and having the attached, e.g., stitched, strip 5a press down on the loose strip in a gripping movement whereby the strips grip each other without slipping, as shown in FIG. 1.

The point of fastening on the dog's leg is generally just up to and under the carpus, which is just behind the back of the ankle of a dog. The booties can of be made in different sizes of width and length and the purchaser will select the correct size according to the width of the dog's paws and the height of the carpus.

The booties can be cleaned easily after use and dried. They take little space and can be brought along and put on the dog when necessary during a walk outdoors.

I claim:

1. A process for making a bootie for canines comprising the steps of:

folding two rectangular pieces of fabric material, having a plurality of side aspects, at about the middle of the length of the material;

attaching said plurality of side aspects to each other to form a multi-layer tube-like member having near the bottom a tapered form and an upper open end;

placing an insulating substance in between said two layers of said tube-like member;

attaching together said two layers along the periphery of the open end, thereby sealing in the insulating substance; and attaching to the open end, around its periphery, a strip of self-gripping material whereby the length of the strip is larger than the periphery of said open end and having a guide loop attached to the periphery on the back side of the bootie.

2. A process according to claim 1, wherein said plurality of side aspects are attached to each other by stitching.

3. A process according to claim 1, wherein said plurality of side aspects are attached to each other by gluing.

4. Protective bootie for the protection of each paw of an animal comprising:

at least two layers of a fabric material, attached to each other along a plurality of edges, to form a substantially tubular member having an inner layer and an outer layer;

said tubular member having a lower, tapered, closed end and an upper, open end formed therein;

a means for attachment of said substantially tubular member about said upper open end, adapted to decrease the diameter of said open end about a leg of an animal; and at least one layer of polyacrylamide crystals interdisposed between said inner layer and said outer layer.

5. The protective bootie of claim 4, wherein said means for attaching said substantially tubular member about a leg of an animal, comprises a complementary hook and loop type fastener strip, positioned on an upper portion of said open end, whereby the length of said strip is larger than the periphery of said open end and a guide loop positioned on the backside of said upper open end of said tubular member which serves to guide said fastener strip.

6. The protective bootie of claim 4, wherein said plurality of edges of said two layers of fabric material are attached together by stitching to form said substantially tubular member.

7. The protective bootie of claim 4, wherein said plurality of edges of said two layers of fabric material are attached together by gluing to form said substantially tubular member.

8. The protective bootie of claim 4, wherein said inner layer is comprised of a strong, lightweight, flexible, ripstop nylon fabric.

9. The protective bootie of claim 4, wherein said inner layer is comprised of a heavy duty fleece fabric.

10. The protective bootie of claim 4, wherein said outer layer is comprised of a heavy duty flexible canvas fabric.

11. The protective bootie of claim 4, wherein said outer layer is comprised of a heavy duty fleece fabric.

12. The protective bootie of claim 1, wherein said outer layer is comprised of a ballistic nylon fabric.

13. Protective bootie for the protection of each paw of an animal comprising:

at least two layers of a fabric material, attached to each other along a plurality of edges, to form a substantially tubular member having an inner layer and an outer layer;

said tubular member having a lower, tapered, closed end and an upper, open end formed therein;

a complementary hook and loop type fastener strip, positioned on an upper portion of said open end, whereby the length of the strip is larger than the periphery of said open end and a guide loop positioned on the backside of said upper open end of said tubular member which serves to guide said fastener strip, adapted to decrease the diameter of said open end about a leg of an animal; and an insulating material interdisposed between said inner layer and said outer layer comprised of polyacrylamide crystals.

14. The protective bootie of claim 13, wherein said inner layer is comprised of a strong, lightweight, flexible, ripstop nylon fabric.

15. The protective bootie of claim 13, wherein said outer layer is comprised of a heavy duty flexible canvas fabric.

* * * * *